UNITED STATES PATENT OFFICE.

LOUIS BROWN, OF RYE, NEW YORK.

POWDER FOR ROOFING AND OTHER PURPOSES.

SPECIFICATION forming part of Letters Patent No. 328,644, dated October 20, 1885.

Application filed February 20, 1885. Serial No. 156,568. (Specimens.)

*To all whom it may concern:*

Be it known that I, LOUIS BROWN, of Rye, in the county of Westchester and State of New York, a citizen of the United States, have invented a new and useful Improvement in Powder for Roofing and other Purposes, of which the following is a full, clear, and exact description.

The invention relates to a material which is especially desirable for use in many arts because of the properties which it possesses; and it comprises a powder which is produced from the material known as "sand iron ore." The existence of this ore has long been known, and various attempts have been made to render it commercially valuable, but only, so far as I am aware, in the direction of smelting in the manner of the common ore or converting it into iron and steel. I have discovered, however, that this sand iron ore can be reduced to a very fine powder, and that the powder thus made possesses many properties which are peculiarly its own, and while these properties may exist in the sand iron ore itself, yet they are not available for use unless the ore has been first reduced to the form of a powder, and of course these properties were unknown until I had ascertained, by experimenting, the use and value of the same.

The powder thus obtained is exceedingly hard and consequently durable. It is absolutely non-corrosive and fire-proof, and it may be used in a great many ways. It may be used to advantage in the manufacture of fire-proof cement, fire-proof roofing, or as a filler in the manufacture of rubber; mixed with proper vehicle, it may be molded into various articles—such as tiles, bricks, &c.—and it may be used for a great many purposes where a powder having the properties which I have mentioned is especially useful and desirable.

There are a number of methods of reducing the ore to pulverulent form; but I prefer machines which reduce it to such shape either by grinding or by attrition, and I do not wish to confine myself to the particular means employed for its reduction to this shape.

Having thus fully described my invention, I claim and desire to secure by Letters Patent of the United States—

As a new article of manufacture, the powdered product obtained by reducing sand iron ore to pulverulent form, all substantially as and for the purposes described.

LOUIS BROWN.

Witnesses:
F. F. RAYMOND, 2d,
FRED. B. DOLAN.